(12) United States Patent
Watanabe et al.

(10) Patent No.: US 7,988,124 B2
(45) Date of Patent: Aug. 2, 2011

(54) NEEDLE VALVE

(75) Inventors: Shigehiro Watanabe, Matsuyama (JP);
Tomohisa Takeda, Matsuyama (JP);
Keiichi Fujita, Matsuyama (JP)

(73) Assignee: Miura Co., Ltd., Matsuyama-Shi (JP)

( * ) Notice: Subject to any disclaimer, the term of this patent is extended or adjusted under 35 U.S.C. 154(b) by 376 days.

(21) Appl. No.: 12/303,182

(22) PCT Filed: Sep. 11, 2007

(86) PCT No.: PCT/JP2007/067636
§ 371 (c)(1),
(2), (4) Date: Dec. 2, 2008

(87) PCT Pub. No.: WO2008/038514
PCT Pub. Date: Apr. 3, 2008

(65) Prior Publication Data
US 2009/0194721 A1 Aug. 6, 2009

(30) Foreign Application Priority Data
Apr. 3, 2008 (JP) .................................. 2006-262627

(51) Int. Cl.
*F16K 31/12* (2006.01)
(52) U.S. Cl. .......... 251/129.12; 251/129.04; 251/129.11
(58) Field of Classification Search ............. 251/129.01, 251/129.04, 129.11, 129.12; 137/553, 554
See application file for complete search history.

(56) References Cited

U.S. PATENT DOCUMENTS

| 6,267,352 B1 * | 7/2001 | Semeyn et al. .......... 251/129.12 |
| 6,764,060 B2 * | 7/2004 | Fukano et al. .......... 251/129.12 |
| 7,059,581 B2 * | 6/2006 | Invernizzi ................ 251/129.12 |
| 7,694,939 B2 * | 4/2010 | Okitsu .......................... 251/264 |
| 2002/0044064 A1 | 4/2002 | Mogi |

FOREIGN PATENT DOCUMENTS

| JP | 63-67475 A | 3/1988 |
| JP | 6-213348 A | 8/1994 |
| JP | 2001-311478 A | 11/2001 |
| JP | 2002-286149 A | 10/2002 |
| JP | 2003-74730 A | 3/2003 |
| JP | 2003-329698 A | 11/2003 |

* cited by examiner

*Primary Examiner* — John K Fristoe, Jr.
(74) *Attorney, Agent, or Firm* — Day Pitney LLP

(57) ABSTRACT

Provided is a needle valve in which a gap between a valve casing and a needle is reliably sealed and an origin of the needle can be readily obtained with high precision. A needle (6) is screwed into a cylindrical rotor (44) of a stepping motor (7) so as to be retractable, and a rotation regulating member (47) prevents the needle (6) from rotating together with the rotor (44). Accordingly, in a case of driving the motor (7) to rotate the rotor (44), the needle (6) vertically moves without rotating. A lower limit sensor (61) and an upper limit sensor (60) detects a detection target piece (49) provided to the rotation regulating member (47), so a lower limit position and an upper limit position of the needle (6) are obtained. The motor (7) is controlled such that, after the motor (7) is driven until the lower limit sensor (61) detects the detection target piece (49), an origin sensor (71) monitors an origin detection plate (62) so as to stop at a predetermined rotation stop position. Thus, an origin of the needle (6) is obtained.

9 Claims, 7 Drawing Sheets

NEEDLE VALVE

TECHNICAL FIELD

The present invention relates to a needle valve. In particular, the present invention relates to various types of needle-type flow rate adjusting valves including one for adjusting a flow rate of oil supplied to a burner of a boiler of an oil combustion type.

BACKGROUND ART

Up to now, a general needle valve includes a valve casing having a hollow box structure and including a flow inlet port and a flow outlet port, and a valve rod screwed into a lid of the valve casing so as to be retractable. By vertically moving the valve rod while rotating, an opening degree of a flow path inside the valve casing is adjusted. In this structure, the valve rod moves in a longitudinal direction thereof while rotating, so a sealed portion between the valve rod and the valve casing is less durable, and there is a fear in that fluid may leak from the sealed portion.

In view of the above, JP2003-329698A (paragraphs [0044] to [0052] and FIG. 1) proposes a structure in which a male screw (13f) of a valve rod (13e) is retractably screwed into a female screw (14a) fixed to a valve casing (11), a valve body (15) is additionally provided to a lower end portion of the valve rod (13e), and the valve body (15) is vertically moved with respect to a needle guide (11e). According to the invention described in JP2003-329698A, owing to a mechanical function of a stopper mechanism (16), a stepping motor is driven until a rotor (13) is forcibly stopped, to thereby obtain an origin.

DISCLOSURE OF INVENTION

Technical Problem

However, the invention described in JP2003-329698A has an extremely complicated structure. Further, with regard to obtaining the origin, the motor is driven until the rotor abuts against a stopper portion and is forcibly stopped in a mechanical point of view, so not only the motor receives a heavy load, but also an obtained position of the origin is not accurate.

An object of the present invention is to provide a needle valve having a simple structure in which a gap between a valve casing and a needle (valve rod) is reliably sealed. Further, another object of the present invention is to realize a needle valve having a simple structure in which an origin of the needle is obtained by readily controlling the needle valve.

Solution to Problem

The present invention has been made to attain the above-mentioned objects, and according to a first aspect of the present invention, there is provided a needle valve including: a stepping motor including a rotor having a cylinder shape; a needle screwed into a center hole of the rotor so that the needle is retractable; a rotation regulating member for allowing the needle to move with respect to the rotor in a longitudinal direction of the needle, and preventing the needle from rotating together with the rotor; a projection point sensor for detecting a projection of the needle by a set length with respect to the rotor by means of a movement of the needle in the longitudinal direction of the needle; an origin detection plate that integrally rotates with the rotor; an origin sensor for monitoring the rotation of the origin detection plate; and a controller for driving the stepping motor until the projection point sensor detects the projection of the needle by the set length, and monitoring the rotation of the origin detection plate by using the origin sensor to control the stepping motor so that the origin detection plate stops at a predetermined rotation stop position.

According to the first aspect of the present invention, the needle is screwed into the cylindrical rotor of the stepping motor, and the needle is prevented from rotating by using the rotation regulating member, so the needle only reciprocates without rotation. Accordingly, the gap between the valve casing and the needle is reliably and durably sealed. Further, the origin of the needle is more accurately obtained because adjustment is performed based on a movement amount of the rotor in a rotation direction thereof in addition to a movement amount of the needle in an axial direction thereof. In addition, the mechanism and the control for obtaining the origin are made simple.

According to a second aspect of the present invention, in the needle valve of the first aspect: the needle valve is formed with a tapered portion provided in a tip end portion of a rod-shaped screw portion with an intermediation of a circular rod portion; the rod-shaped screw portion is screwed into the center hole of the rotor so that the rod-shaped screw portion is retractable, the circular rod portion is retractable with respect to a valve casing while a gap between the circular rod portion and the valve casing is sealed, and the tapered portion is inserted into the valve casing; the rotation regulating member is fixed to a base end portion of the rod-shaped screw portion, and is retractable along a support column whose position is set with respect to the valve casing while being prevented from rotating together with the rod-shaped screw portion; and the projection point sensor is a photosensor for detecting that the rotation regulating member is at a predetermined position.

According to the second aspect of the present invention, the needle is only necessary to include the rod-shaped screw portion, the circular rod portion, and the tapered portion. Further, the gap between the needle reciprocating without rotating and the valve casing is sealed at the circular rod portion thereof, so the gap is reliably and durably sealed. In addition, in order to prevent the needle from rotating together with the rotor, the rotation regulating member is provided to the base end portion of the needle, and the rotation regulating member is only necessary to be moved along the support column. Further, the projection of the needle by the set length with respect to the rotor is performed by detecting the position of the rotation regulating member by using the photosensor. Thus, the needle valve has a simple structure and is obtained at low cost.

According to a third aspect of the present invention, in the needle valve of the second aspect: the origin detection plate is a circular plate having a detection target region having a substantially sector shape formed at a portion in an outer circumferential portion of the circular plate; the origin sensor is a photosensor for detecting the detection target region; and the controller drives the stepping motor until the projection point sensor detects the projection of the needle by the set length, causes the stepping motor to rotate in one direction until the detection target region passes the origin sensor and proceeds by a predetermined amount, and causes the stepping motor to rotate in a reverse direction until the origin sensor detects the detection target region, to obtain an origin of the needle.

According to the third aspect of the present invention, by using the photosensor and the circular-plate shaped origin detection plate, the position of the rotor in the circumferential direction can be detected with a simple structure and at low cost. Further, the origin is obtained by controlling the stepping motor such that the origin sensor is returned after the detection target region passes the origin sensor. Thus, a backlash caused at the screw portion between the rotor and the needle can be eliminated.

According to a fourth aspect of the present invention, the needle valve of the third aspect further includes: a rotation detection plate being a circular plate and integrally rotating with the rotor; and a rotation sensor for monitoring the rotation of the rotation detection plate. In the needle valve, the controller monitors, during driving and controlling the stepping motor, an abnormal rotation of the stepping motor in response to a detection signal from the rotation sensor.

According to the fourth aspect of the present invention, the rotation of the rotor is monitored by using the rotation detection plate and the rotation sensor, so in the unlikely event of abnormal rotation of the stepping motor, the abnormal rotation can be detected.

According to a fifth aspect of the present invention, in the needle valve of the fourth aspect, the controller monitors, during driving and controlling the stepping motor, the abnormal rotation of the stepping motor based on a detection of the detection target region by the origin sensor by one rotation of the rotor.

According to the fifth aspect of the present invention, the origin detection plate and the origin sensor are used to monitor the rotor by one rotation, so in the unlikely event of abnormal rotation of the stepping motor, the abnormal rotation can be more reliably detected.

According to a sixth aspect of the present invention, in the needle valve of the fifth aspect: the rotation sensor is capable of detecting the rotation of the rotation detection plate by a step angle of the stepping motor; and the origin detection plate includes the detection target region having a region corresponding to twice to a plurality of times as large as the step angle of the stepping motor.

According to the sixth aspect of the present invention, it is possible to detect the rotation of the rotation detection plate by the step angle of the stepping motor, so the abnormal rotation can be reliably detected by comparing with pulse output to the stepping motor. On the other hand, a misdetection of the rotation detection plate due to oscillation and the like may be prevented, because the detection target region on the origin detection plate is larger than the step angle.

According to a seventh aspect of the present invention, in the needle valve of any one of the second to sixth aspects: a tapered portion of the needle is inserted in an orifice included in the valve casing so that the tapered portion is retractable to adjust a flow rate; and a shape of the tapered portion and a shape of the orifice are formed such that a proportional relationship between an opening degree and the flow rate is established.

According to the seventh aspect of the present invention, the proportional relationship between the opening degree and the flow rate is established, so the flow rate can be adjusted more smoothly and more accurately.

According to an eighth aspect of the present invention, the needle valve of any one of the first to sixth aspects further includes a retreat point sensor for detecting a retraction limit of the needle with respect to the rotor.

According to a ninth aspect of the present invention, the needle valve of the seventh aspect further includes a retreat point sensor for detecting a retraction limit of the needle with respect to the rotor.

According to the eighth and ninth aspects of the present invention, by providing the retreat point sensor, the needle is prevented in advance from being retracted more than necessary.

Advantageous Effects of Invention

According to the needle valve of the present invention, the gap between the valve casing and the needle can be sealed by employing the simple structure. Further, the needle only reciprocates at a sealed portion without rotating, so the gap is reliably and durably sealed. Further, according to the needle valve of the present invention, the origin of the needle is obtained with high accuracy by employing the simple structure and readily controlling the needle valve.

BRIEF DESCRIPTION OF THE DRAWINGS

In the accompanying drawings.

BEST MODE FOR CARRYING OUT THE INVENTION

Figure 1:
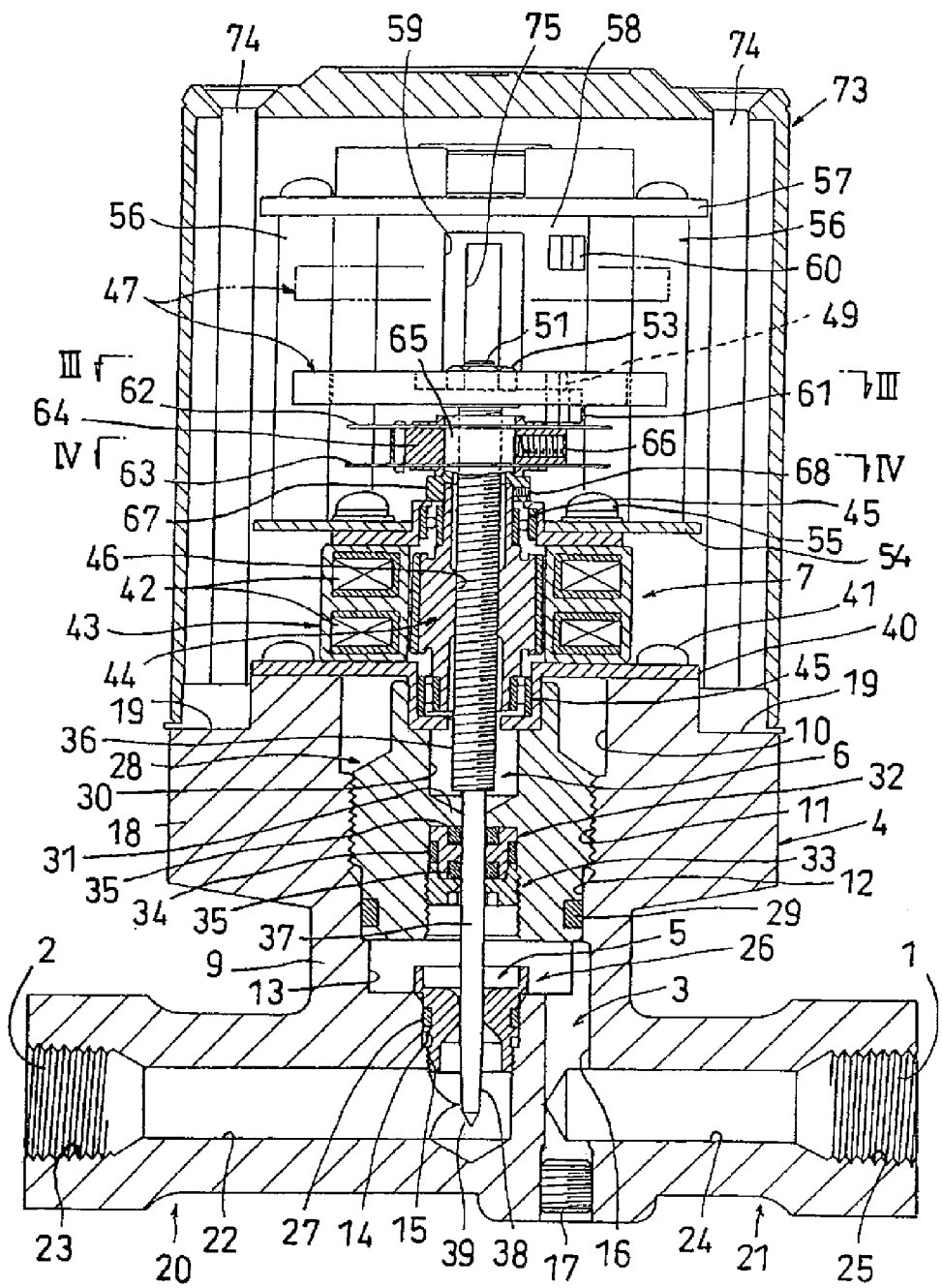
FIG. 1 is a front longitudinal-sectional view showing a needle valve according to an embodiment of the present invention.

Next, an embodiment mode of the present invention will be described.

A needle valve of the present invention includes: a valve casing including a flow inlet port and a flow outlet port; a needle for adjusting an opening degree of a fluid flow path formed in the valve casing; a motor for moving the needle in order to adjust the opening degree; and a controller for controlling a rotation of the motor.

The valve casing includes the fluid flow path formed therein. The fluid flow path includes both end portions formed so as to open to an outer surface of the valve casing. One of opening portions serves as a flow inlet port of a fluid and another opening portion serves as a flow outlet port of a fluid. A valve seat is provided in a midway of the fluid flow path. A tip end portion of the needle may seat on the valve seat to close the fluid flow path. In this embodiment mode, however, the tip end portion of the needle retractably moves with respect to a hole of the valve seat to adjust a flow rate. To be specific, the valve seat of this embodiment mode includes an orifice, and the tip end portion of the needle is inserted into the orifice so as to be retractable.

The needle includes a long-slender rod member, and provided to the valve casing so as to be retractable. The needle of this embodiment mode includes: a rod-shaped screw portion structured such that a male screw is formed on an outer circumferential surface of a circular rod; a circular rod portion provided at a tip end portion of the rod-shaped screw portion and having a flat circumferential surface; and a tapered portion provided at a tip end portion of the circular rod portion and structured so as to be tapered as descending to a tip end side thereof. The tip end portion of the needle structured as described above is inserted into the valve casing via a needle insertion hole so as to be retractable. In this case, the circumferential surface of the circular rod portion seals a gap between the needle and the insertion hole. As to be described later, the needle reciprocates without rotating, so the gap is reliably and durably sealed.

A stepping motor (also referred to as a pulse motor or a step motor) whose rotation direction, rotation speed, and rotation amount are readily controlled is employed to retractably move the needle with respect to the valve casing. The motor causes the cylindrical rotor to rotate. Typically, the rotor of the motor itself has a cylinder shape, but the motor may include a cylinder member to which a rotation of a rotation axis of the motor is transmitted via a gear. In this embodiment mode, the motor itself includes the cylindrical rotor, and the rod-shaped screw portion of the needle is screwed into a center hole of the rotor so as to be retractable. In order to attain this, a female screw is formed in the center hole of the cylindrical rotor.

In order to prevent the needle from rotating together with the rotor, the needle includes a rotation regulating member. In this embodiment mode, the rotation regulating member is fixed to a base end portion of the needle penetrating the rotor. The rotation regulating member is capable of moving only along a support column positioned with respect to the valve casing. The support column is provided in parallel with the needle. Accordingly, in the case of rotating the rotor, the needle is retractable with respect to the rotor along a longitudinal direction thereof without rotating.

A projection point sensor and a retreat point sensor detect projection of the needle by a set length with respect to the rotor and retreat of the needle with respect to the rotor, respectively, based on movement of the needle in the longitudinal direction. In this embodiment mode, the projection point sensor detects that the rotation regulating member is at a predetermined projection position, that is, that the needle is at a position in the vicinity of an origin to be mentioned below. In the meantime, the retreat point sensor detects that the rotation regulating member is at a predetermined retreat position, that is, that the needle is at a limit position above which the needle comes off from the needle insertion hole. Each of the sensors is preferably constituted by a photosensor. In this embodiment mode, at the projection position, the base end portion of the tapered portion of the needle is located at a portion of the orifice having the smallest diameter. In the meantime, at the retreat position, the tip end portion of the tapered portion of the needle is located at the portion of the orifice having the smallest diameter. In this case, it is preferable that a shape of the tapered portion and a shape of the orifice be formed such that a proportional relationship between the opening degree and the flow rate is established.

The needle valve of this embodiment mode includes an origin detection plate and a rotation detection plate so as to be capable of integrally rotating with the rotor. Typically; the origin detection plate and the rotation detection plate are circular plates having an identical diameter size, provided so as to be spaced apart and in parallel, and capable of integrally rotating with the rotor.

The origin detection plate is a circular plate having a detection target region formed in a portion of an outer circumferential portion thereof. To be specific, a circular plate made of an opaque material is employed, and a notch having a substantially sector shape formed therein. Conversely, a circular plate made of a transparent material may be employed, and an opaque region having a substantially sector shape may be formed in a portion of an outer circumferential surface thereof. In each of those cases, the detection target region having the substantially sector shape is formed concentrically with the rotor and the circular plate. Further, the detection target region may be formed by simply extruding an opaque material from the rotor or a cylinder body integrally rotating therewith in an outer radius direction thereof.

The rotation detection plate is a circular plate having detection target regions formed along an outer circumferential portion thereof at identical intervals in a circumferential direction thereof. To be specific, a circular plate made of an opaque material is employed, and notches are formed therein at the identical intervals in the circumferential direction. Conversely, a circular plate made of a transparent material may be employed, and opaque regions are formed in a portion of an outer circumferential surface thereof at identical intervals in a circumferential direction thereof. It is preferable that each of the detection target regions formed in the rotation detection plate have a substantially rectangular shape or a substantially sector shape along a radius direction thereof.

The detection target region of the origin detection plate can be detected by the origin sensor. That is, the rotation of the origin detection plate is monitored by the origin sensor. In the meantime, each of the detection target regions of the rotation detection plate can be detected by the rotation sensor. That is, the rotation of the rotation detection plate is monitored by the rotation sensor. Preferably, each of the origin sensor and the rotation sensor is constituted by a photosensor. In this case, the rotation of the rotation detection plate can preferably be detected by the rotation sensor by a step angle of the stepping motor, Meanwhile, the origin detection plate preferably has the detection target region having a region twice to a plurality of times as large as the step angle of the stepping motor.

The controller is electrically connected to the projection point sensor, the retreat point sensor, the origin sensor, and the rotation sensor in addition to the motor. Further, the controller outputs a control signal including a driving pulse to the motor, to thereby control the motor to drive in a normal direction or a reverse direction. The controller also controls the motor to stop in response to a detection signal from the rotation sensor (to be specific, the number of a pulse detected by the photosensor) corresponding to the detection signal from the origin sensor being a reference, to thereby adjust a valve opening degree Further, the controller detects the projection position and the retreat position of the needle with respect to the rotor based on a detection signal from the projection point sensor and a detection signal from the retreat point sensor, respectively. Further, the controller monitors an abnormal rotation of the rotor, i.e., an abnormal rotation of the motor, in response to the detection signal from the rotation sensor.

Further, the controller controls the motor in response to the detection signal from the projection point sensor and the detection signal from the origin sensor, to thereby obtain an origin of the needle. To be more specific, the controller first controls the motor until the needle comes to the projection position. The detection signal from the projection point sensor is used to perform this control. After the needle is caused to move to the projection position, the controller controls the motor such that the origin detection plate stops at a predetermined rotation stop position. The detection signal from the origin sensor indicating that the origin detection plate detects the detection target region is used to perform this control. In this case, it is preferable that the controller cause the motor to rotate in one direction until the detection target region passes the origin sensor by a predetermined amount, and then cause the motor to rotate in a reverse direction until the origin sensor detects the detection target region again. Accordingly, a backlash caused by the screw portion between the rotor and the needle can be eliminated.

In addition, it is preferable that the controller monitor the abnormal rotation of the motor during controlling the driving of the motor based on the detection of the detection target region by the origin sensor by one rotation of the rotor. In a case of employing the rotation sensor alone, a malfunction may occur due to vibration. However, by employing the detection sensor in combination therewith as described above, the abnormal rotation of the rotor can be reliably detected. In order to reliably detect the abnormal rotation of the rotor, as described above, it is preferable that the detection target region of the origin detection plate be formed larger than the step angle of the motor.

Mode for the Invention

Hereinafter, referring to the drawings, a specific embodiment of the present invention will be described in detail.

Figure 2:
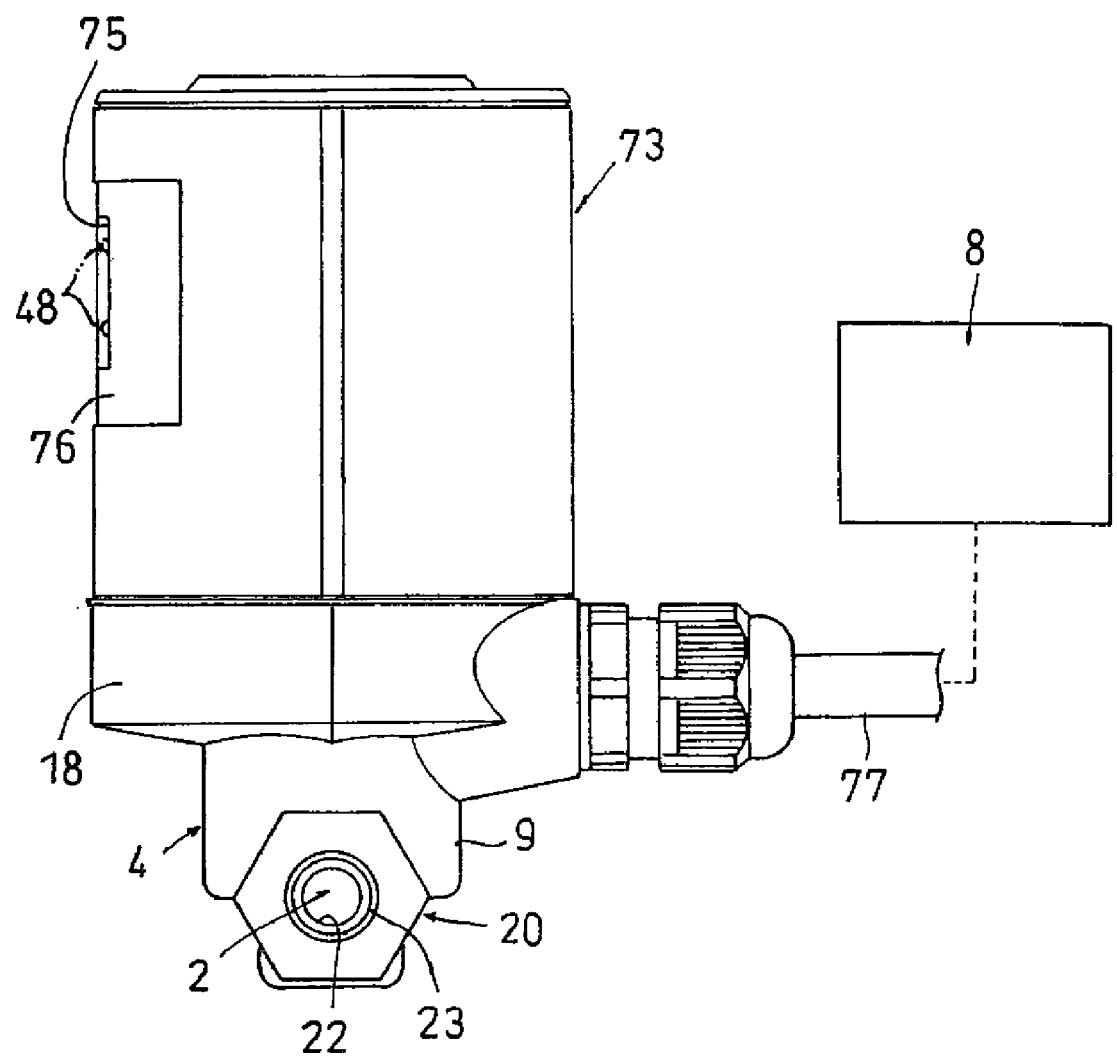
FIG. 2 is a left-side view of the needle valve of FIG. 1.
Figure 3:
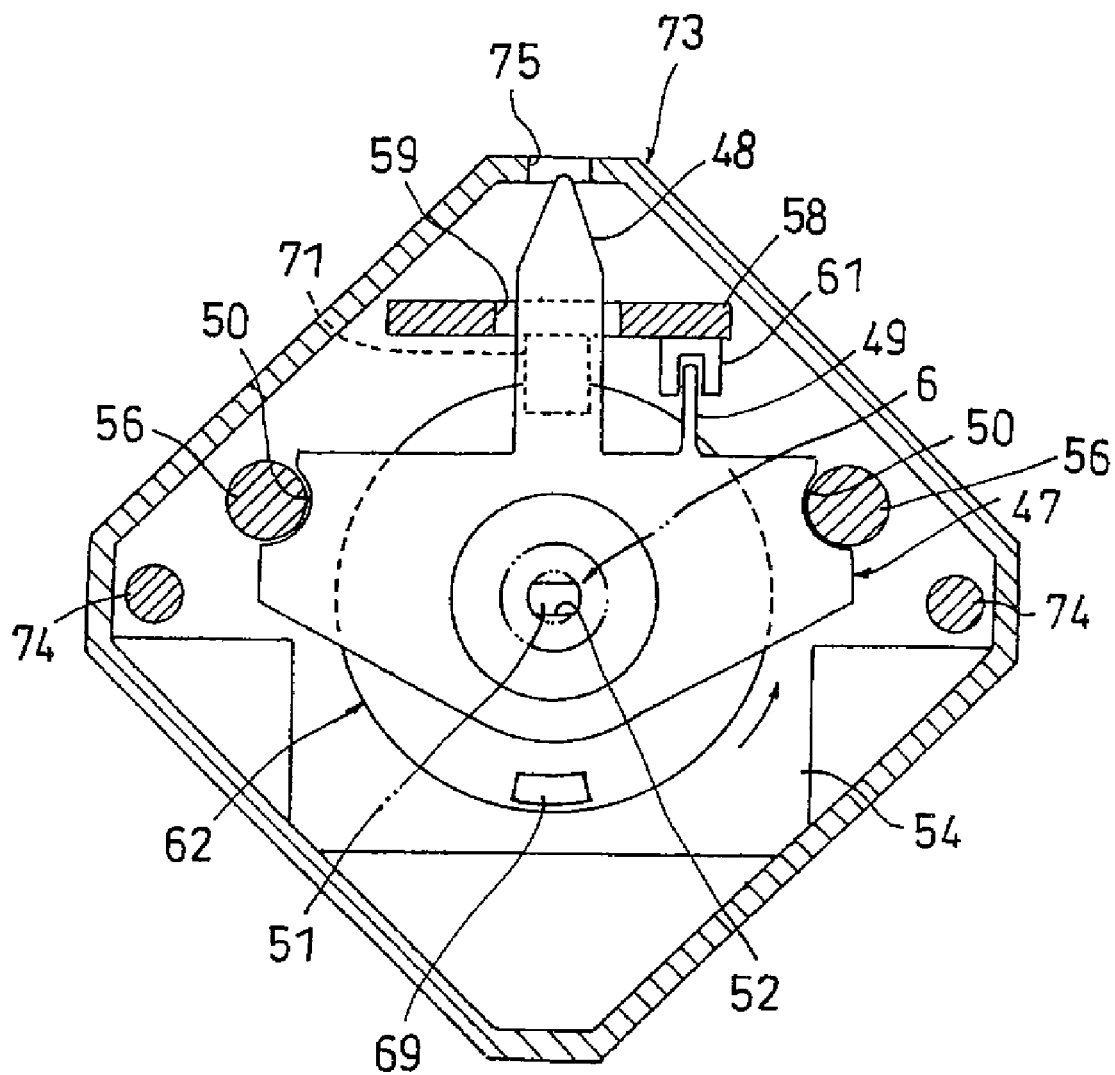
FIG. 3 is a cross sectional view of the needle valve taken along the line III-III of FIG. 1.
Figure 4:
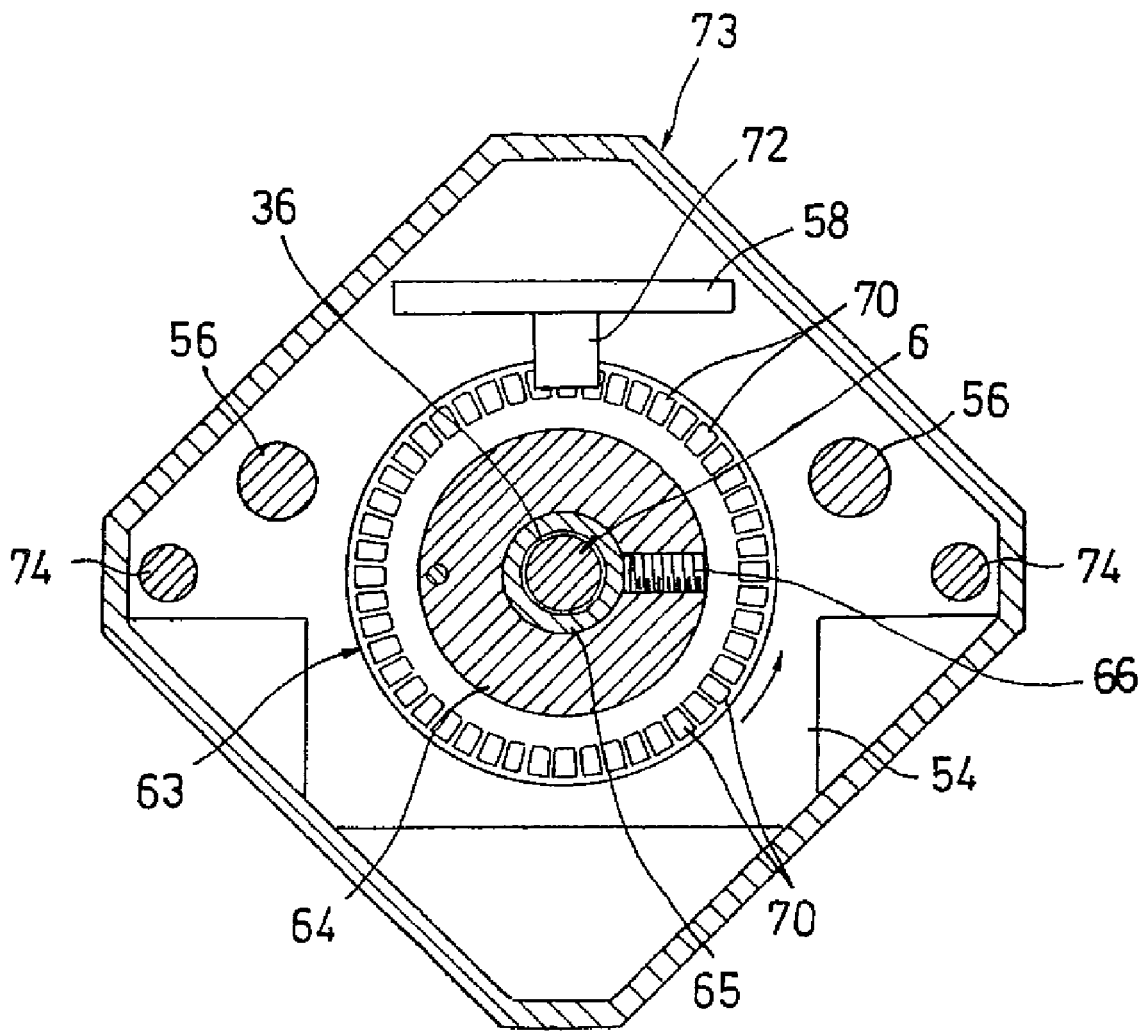
FIG. 4 is a cross sectional view of the needle valve taken along the line IV-IV of FIG. 1.
Figure 5:
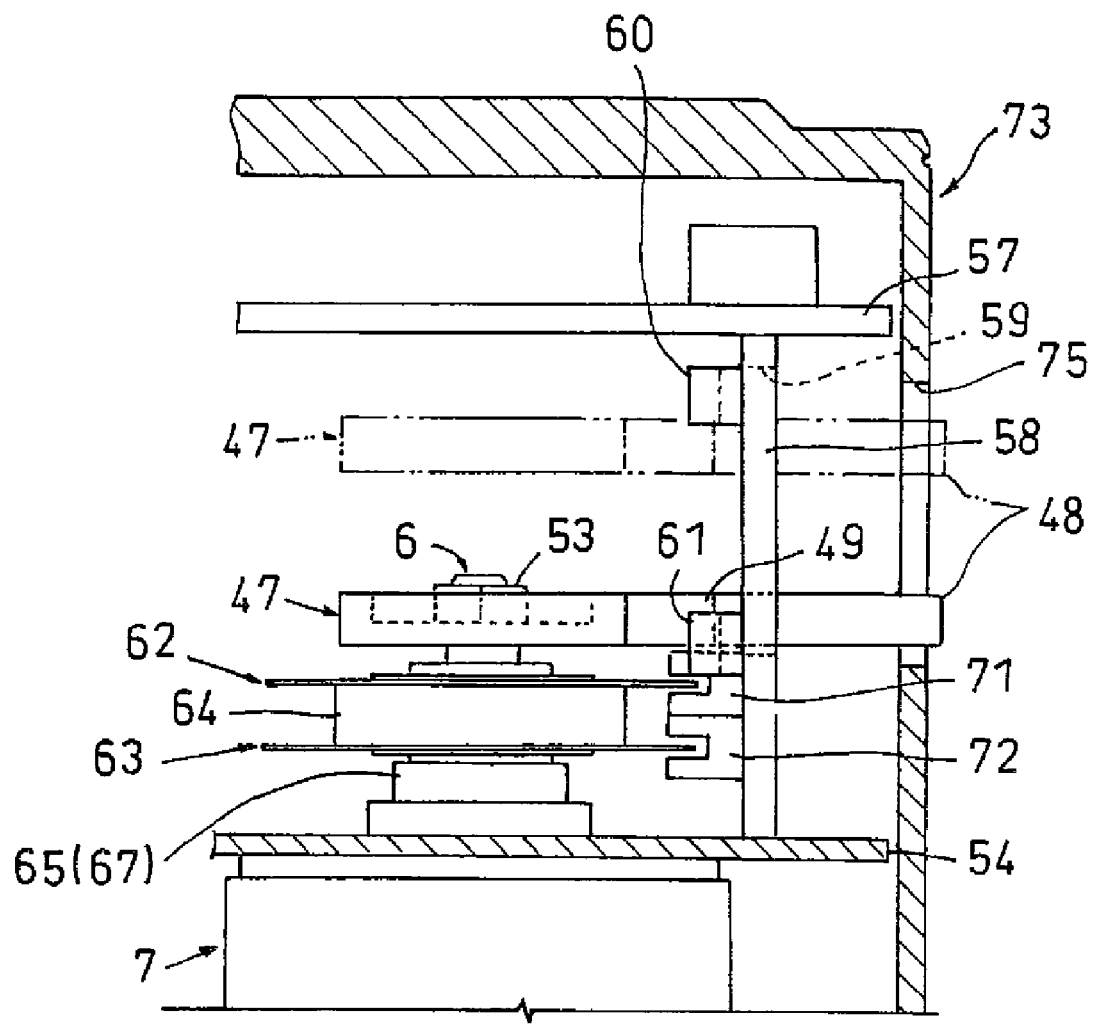
FIG. 5 is a light-side longitudinal-sectional view showing an upper portion of the needle valve of FIG. 1, while omitting a part thereof.

FIGS. 1 and 2 are diagrams showing a needle valve according to an embodiment of the present invention. FIG. 1 is a front longitudinal-sectional view thereof, and FIG. 2 is a left-side view thereof. Further, FIG. 3 is a cross sectional view of the needle valve taken along the line III-III of FIG. 1, FIG. 4 is a cross sectional view of the needle valve taken along the line IV-IV of FIG. 1, and FIG. 5 is a right-side longitudinal-sectional view showing an upper portion of the needle valve of this embodiment, while omitting a part thereof.

The needle valve of this embodiment includes: a valve casing 4 including a fluid flow path 3 opened to a flow inlet port 1 and a flow outlet port 2; an orifice 5 provided in a midway of the fluid flow path 3; a needle 6 retractable with respect to the orifice 5 to adjust an opening degree of the fluid flow path 3; a motor 7 for retractably moving the needle 6 in order to adjust the opening degree thereof; and a controller 8 for controlling a rotation of the motor 7.

The valve casing 4 includes a cylinder-shaped main body portion 9 provided such that an axial line thereof is vertically formed. The main body portion 9 includes stepped holes 10 to 15 formed along the axial line. The stepped holes are open only toward an upper direction. The stepped holes, that is, a first hole 10, a second hole 11, a third hole 12, a fourth hole 13, a fifth hole 14, and a sixth hole 15, are formed so as to have diameters downwardly reduced in the stated order. The second hole 11 and the sixth hole 15 are formed to serve as screw holes. From a bottom surface of the fourth hole 13 (i.e., a step portion between the fourth hole 13 and the fifth hole 14), a vertical hole 16 opened toward a lower portion of the valve casing 4 is formed. The vertical hole 16 is formed in a right external-circumferential portion of the fourth hole 13 so as to communicate with the fourth hole 13, and spaced apart from and being in parallel with the fifth hole 14 and the sixth hole 15. In a lower opening of the vertical hole 16, a locking screw 17 is screwed to clog the vertical hole 16.

In an upper portion of the main body portion 9, a thick flange 18 having a square cross sectional shape is integrally formed. The flange 18 having a square cross sectional shape is provided so that four corners thereof face front, rear, left, and right directions. Four upper corners of the flange 18 are notched and formed to be step portions 19. Each of the step portions 19 of the four corners of the flange 18 has a substantially triangular shape in a plan view.

Tube portions 20 and 21 are integrally formed with the main body portion 9 at a lower portion thereof so as to extend in left and right directions, respectively. A hole 22 in the left-side tube portion 20 has an opening in a left end surface of the left-side tube portion 20, and an inner surface of the left-side tube portion 20 at the opening side is formed as a screw hole 23. Further, the hole 22 of the left-side tube portion 20 extends from the left end surface to a portion exactly below the sixth hole 15 to communicate with the sixth hole 15. Meanwhile, a hole 24 in the right-side tube portion 21 has an opening in a right end surface of the right-side tube portion 21, and an inner surface of the right-side tube portion 21 at the opening side is formed as a screw hole 25. Further, the hole 24 of the right-side tube portion 21 extends from the right end surface to a portion where the right-side tube portion 21 crosses with the vertical hole 16 to communicate with the vertical hole 16. Each of the screw hole 23 of the left-side tube portion 20 and the screw hole 25 of the right-side tube portion 21 serves as a connection portion with respect to piping (not shown). In this embodiment, the right-side tube portion 21 includes the flow inlet port 1, and the left-side tube portion 20 includes the flow outlet port 2.

A valve seat 26 is provided from a lower portion of the fourth hole 13 to the sixth hole 15. The valve seat 26 has a stepped cylinder shape, and is screwed from above the valve casing 4 into the fifth hole 14 and the sixth hole 15. In this case, an outer surface of a lower end portion of the valve seat 26 is screwed into the sixth hole 15, so the valve seat 26 is fixed to the valve casing 4. The valve seat 26 is provided with an O ring 27 at an outer surface thereof corresponding to a position of the fifth hole 14. Accordingly, a gap between the outer surface of the valve seat 26 and an inner surface of the fifth hole 14 is sealed.

The valve seat 26 includes the orifice 5 formed along the axial line so as to vertically penetrate the valve seat 26. The orifice 5 has an arbitrary shape, and in this embodiment, the orifice 5 is formed so as to have a substantially-semicircular longitudinal-sectional shape in which a center portion thereof in the vertical direction extrudes toward an inner side in a radius direction. That is, the orifice 5 is formed in the valve seat 26 so as to have a portion having a diameter downwardly reduced to have a specific shape and a portion having a diameter downwardly increased to have a specific shape.

A plug 28 is provided from the first hole 10 to the third hole 12. The plug 28 has a stepped cylinder shape having a hexagonal head at an upper portion thereof. The plug 28 is screwed from above the valve casing 4 into the second hole 11 and the third hole 12. In this case, an outer surface of a center portion of the plug 28 is screwed into the second hole 11, so the plug 28 is fixed to the valve casing 4. The plug 28 is provided with an O ring 29 at an outer surface thereof corresponding to a position of the third hole 12. Accordingly, a gap between the outer surface of the plug 28 and an inner surface of the third hole 12 is sealed.

The plug 28 includes a through-hole 30 vertically formed therein along an axial line thereof. The through-hole 30 includes at a center portion thereof in the vertical direction a recessed diameter portion 31 formed therein so as to extend in an inner side of a radius direction thereof. A needle guide 32 is inserted in the through-hole 30 from therebelow so that the needle guide 32 abuts against a lower surface of the recessed diameter portion 31. In a lower portion of the through-hole 30, a guide stop 33 is further screwed. The needle guide 32 is sandwiched between the guide stop 33 and the recessed diameter portion 31 to be fixed. A through-hole is formed in a center portion of each of the needle guide 32 and the guide stop 33.

The needle guide 32 is provided with an O ring 34 at an outer surface thereof. Accordingly, a gap between the outer surface of the needle guide 32 and an inner surface of the through-hole 30 of the plug 28 is sealed. The needle guide 32 is provided with X rings 35 at a portion between the needle guide 32 and the recessed diameter portion 31 and a portion between the needle guide 32 and the guide stop 33, respectively. Each of the X rings 35 is a sealing ring having a substantially X-shaped sectional shape and made of a synthetic resin. Those X rings 35 seal a gap between the needle guide 32 and the needle 6.

The needle 6 is formed of a stepped circular rod member which is vertically long-slender. To be more specific) the needle 6 includes: a rod-shaped screw portion 36 structured such that a male screw is formed on an outer circumferential surface of a circular rod; a circular rod portion 37 provided at a tip end portion of the rod-shaped screw portion 36 and having a flat circumferential surface; and a tapered portion 38 provided at a tip end portion of the circular rod portion 37 and structured so as to be tapered as descending to a tip end side thereof. The tapered portion 38 is inclined moderately, and a conical portion 39 is formed at the tip end portion of the tapered portion 38.

A tip portion of the needle 6 is inserted to the valve casing 4 from thereabove while a base end portion thereof is exposed above the valve casing 4. In this case, the circular rod portion 37 is inserted into the needle guide 32, and the tapered portion 38 is inserted into the orifice 5. Further, the rod-shaped screw portion 36 is provided so as to be extendingly exposed from an upper opening of the plug 28. The needle 6 is retractable in the vertical direction in a predetermined range with respect to the valve casing 4. Wherever the needle 6 is located, the needle guide 32 is provided with the circular rod portion 37. The needle guide 32 is provided with the X rings 35 at two positions, i.e., upper position and lower position, so the gap between the circumferential surface of the circular rod portion 37 and the needle guide 32 is reliably sealed. Accordingly, the needle 6 is vertically retractable with respect to the valve casing 4 while the gap between the needle 6 and the valve casing 4 is sealed.

The valve casing 4 is provided with the motor 7 for driving the needle 6 in an upper portion thereof. A stepping motor having a conventionally-known structure is employed as the motor 7. The motor 7 is provided at a center portion of the upper portion of the valve casing 4 so as to close the upper opening of the first hole 10. In this case, a mounting plate 40 of the motor 7 is superimposed on a top surface of the valve casing 4 and fixed by using screws 41.

The motor 7 has a structure in which a cylinder-shaped rotor 44 rotates with respect to a stator 43 having coils 42. The rotor 44 is supported by bearings 45 at an upper end portion and a lower end portion thereof, respectively, and is freely revolvable with respect to the stator 43. The cylinder-shaped rotor 44 includes a center hole 46 having at least a portion formed as a screw hole, formed therein. The needle 6 is provided at the center hole 46 of the rotor 44 so as to penetrate the center hole 46. In this case, the rod-shaped screw portion 36 of the needle 6 is screwed into the screw hole of the rotor 44 so that the needle 6 is retractable.

An upper end portion of the needle 6 is provided so as to be exposed above the motor 7, and a rotation regulating member 47 is provided to the upper end portion. As shown in FIG. 3, the rotation regulating member 47 of this embodiment is made by a plate member having a substantially home-plate shape. An indication piece 48 is integrally formed with the rotation regulating member 47 at a center portion in a lateral direction thereof so as to extend in a rear direction thereof. The indication piece 48 has a rectangular shape and a rear end portion thereof is formed to have a substantially triangular shape. Further, the rotation regulating member 47 includes a detection target piece 49 having a plate shape in the vertical direction at a right side of a rear end edge thereof. The detection target piece 49 is integrally formed with the rotation regulating member 47 so as to extend in the rear direction thereof. Further, notches 50 each having a substantially semicircular shape are formed at a left end portion and a right end portion of the rotation regulating member 47, respectively.

A reduced-diameter screw portion 51 is formed at a top end portion of the rod-shaped screw portion 36 of the needle 6. The reduced-diameter screw portion 51 is formed such that both end portions in a diameter direction of the circular rod are notched. Further, a hole 52 corresponding to a sectional shape of the reduced-diameter screw portion 51 is formed in the rotation regulating member 47. Thus, the reduced-diameter screw portion 51 of the needle 6 is screwed into the hole 52 of the rotation regulating member 47, and the reduced-diameter screw portion 51 is fastened with a nut 53 from the above, so the rotation regulating member 47 can be mounted to the needle 6 such that the rotation regulating member 47 and the needle 6 cannot rotate with respect to each other.

A base plate 54 is fixed onto a top surface of the motor 7 by using screws 55. The base plate 54 is horizontally held on the top surface of the motor 7. At a left end portion and a right end portion of the base plate 54, support columns 56 are fixed, respectively, so as to vertically extend in an upper direction with respect to the plate surface. The rotation regulating member 47 is positioned so that the left and right notches 50 are matched with outer circumferential surfaces of the support columns 56. Accordingly, by means of the support columns 56, the rotation regulating member 47 cannot rotate and can only move vertically along the support columns 56.

With this structure, the needle 6 can only vertically move with respect to the rotor 44 without rotating. That is, in a case where the motor 7 is driven to rotate the rotor 44, the needle 6 is prevented from rotating with the rotor 44 by the rotation regulating member 47. Therefore, the needle 6 does not rotate but vertically moves. According to a rotation direction of the rotor 44, the needle 6 can be moved downward or upward.

A connector board 57 is horizontally held in upper portions of the left and right support columns 56. A sensor board 58 is vertically provided behind the base plate 54 so as to bridge the base plate 54 and the connector board 57. The sensor board 58 has a substantially rectangular-plate shape, and provided so that plate surfaces face the front and rear directions. A rectangular-shaped hole 59 is formed in a center portion of the sensor board 58 in a width direction thereof so as to vertically extend. The indication piece 48 of the rotation regulating member 47 is inserted in the rectangular-shaped hole 59 so as to be capable of moving vertically.

An upper limit sensor (retreat point sensor) 60 and a lower limit sensor (projection point sensor) 61 are provided in a right side of the sensor board 58 so as to be spaced apart vertically. Each of the sensors 60 and 61 is structured by a light-transmission type photo interrupter, and detects whether or not the detection target piece 49 of the rotation regulating member 47 exists between a light emitting device and a light receiving device. The detection target piece 49 of the rotation regulating member 47 vertically moves together with the needle 6, and the upper limit sensor 60 and the lower limit sensor 61 are provided along a path on which the detection target piece 49 vertically moves. In each of the sensors 60 and 61, based on whether or not the detection target piece 49 exists at a position corresponding to an optical path between the light emitting device and the light receiving device, the light receiving device receives/does not receive light from the light emitting device. Accordingly, each of the sensors 60 and 61 can detect the detection target piece 49.

Figure 6:
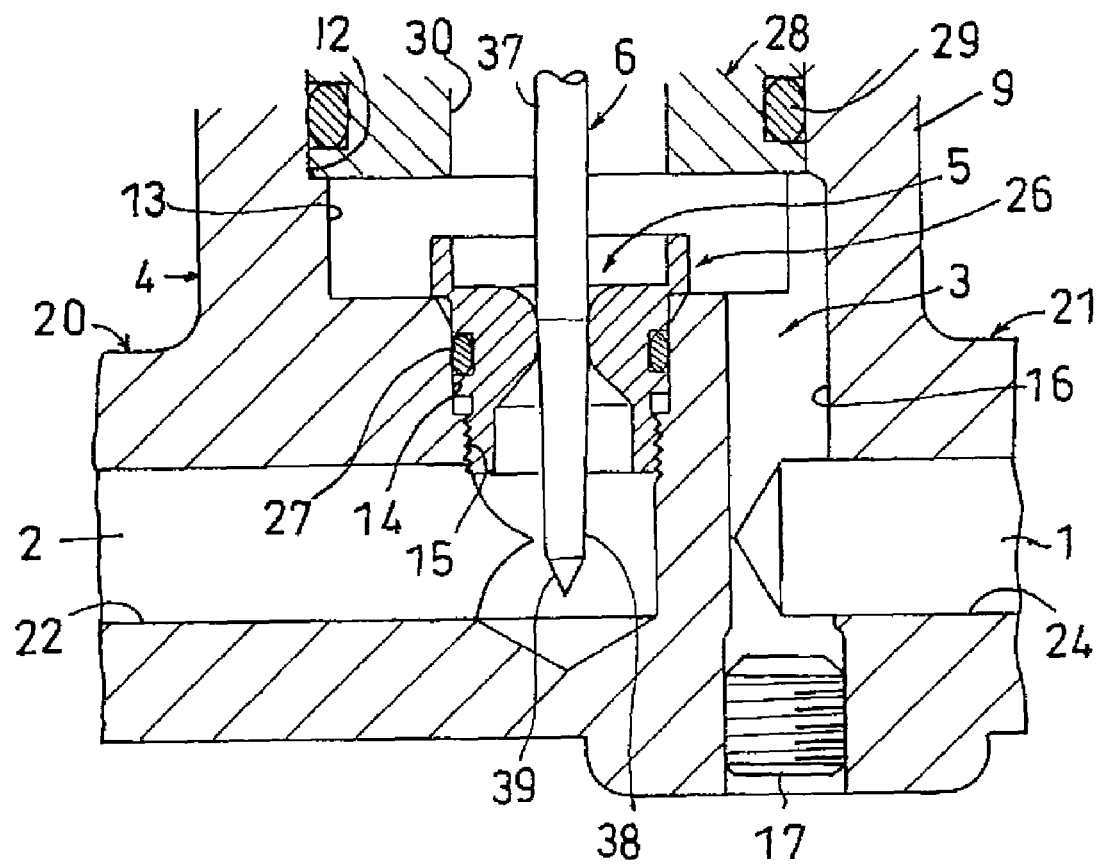
FIG. 6 is a partially enlarged view of the needle valve of FIG. 1, in which a needle is located at a lower limit position.
Figure 7:
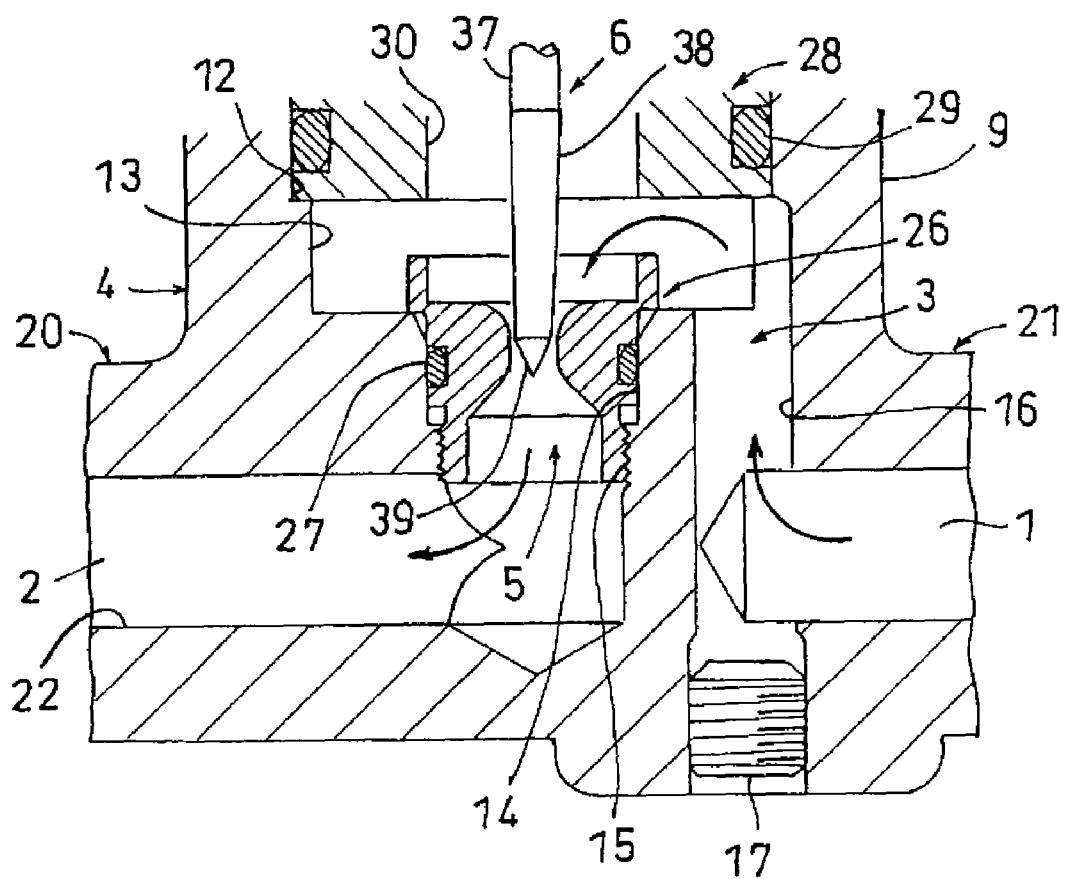
FIG. 7 is a partially enlarged view of the needle valve of FIG. 1, in which the needle is located at an upper limit position.

FIGS. 6 and 7 are partially enlarged views of the needle valve of FIG. 1. FIG. 6 shows the needle 6 at a lower limit position, and FIG. 7 shows the needle 6 at an upper limit position. As shown in FIG. 6, at the lower limit position where the lower limit sensor 61 detects the detection target piece 49, a base end portion of the tapered portion 38 of the needle 6 is positioned at a minimum-diameter portion of the orifice 5 substantially without a gap. Meanwhile, as shown in FIG. 7, at the upper limit position where the upper limit sensor 60 detects the detection target piece 49, a tip end portion of the tapered portion 38 of the needle 6 is positioned at the minimum-diameter portion of the orifice 5. By employing the lower limit sensor 61 and the upper limit sensor 60, the needle 6 is vertically moved substantially between the lower limit position and the upper limit position.

The tapered portion 38 of the needle 6 is inserted into the orifice 5. According to a vertical position of the needle 6, the opening degree of the fluid flow path 3 is determined. It is preferable that the shape of the tapered portion 38 and the shape of the orifice 5 be set so that a proportional relationship between the opening degree (i.e., an amount of the vertical movement of the needle 6) and a flow rate.

An origin detection plate 62 and a rotation detection plate 63 are provided to an upper end portion of the rotor 44 so as to be integrally rotatable with the rotor 44. The origin detection plate 62 and the rotation detection plate 63 each structured by a stainless steel plate having an identical diameter are coaxially provided so as to be vertically spaced apart and in parallel. In this embodiment, the origin detection plate 62 is provided in an upper side and the rotation detection plate 63 is provided in a lower side. Each of the origin detection plate 62 and the rotation detection plate 63 is fixed to a circumferential surface of a thick cylinder member 64 in a brim manner. Further, an attachment cylinder 65 having a stepped cylinder shape is inserted into a hole formed in the cylinder member 64 so as to be integrally fixed by a locking screw 66.

An increased diameter portion 67 is formed in a lower portion of the attachment cylinder 65. Meanwhile, an upper end portion of the rotor 44 is provided so as to extend upward from the base plate 54. Accordingly, the increased diameter portion 67 of the attachment cylinder 65 is inserted into the upper end portion of the rotor 44 so as to be integrally fixed by a locking screw 68. Accordingly, the origin detection plate 62 and the rotation detection plate 63 can integrally rotate with the rotor 44. The needle 6 completely extends through the attachment cylinder 65 provided as described above, and the rotation regulating member 47 is fixed to an upper end portion thereof.

As shown in FIG. 3, a detection target region 69 is formed in a portion of an outer circumferential portion of the origin detection plate 62. The detection target region 69 is formed as a notch having a substantially sector shape along a circumferential direction of the origin detection plate 62. Meanwhile, as shown in FIG. 4, a number of detection target portions 70 are formed in an entire outer circumferential portion of the rotation detection plate 63 at identical intervals in a circumferential direction thereof. Each of the detection target portions 70 has an identical shape and an identical size, and is formed as a notch having a substantially sector shape as exemplified in FIG. 4. The origin detection plate 62 is formed such that notch being the detection target region 69 is punched in a circular stainless steel plate, and the rotation detection plate 63 is formed such that notches being the detection target portions 70 are punched in a circular stainless steel plate.

An origin sensor 71 and a rotation sensor 72 for detecting the detection target region 69 of the origin detection plate 62 and the detection target portions 70 of the rotation detection plate 63, respectively, are provided so as to be spaced apart vertically in a lower portion of a middle portion in a lateral direction of the sensor board 58. Each of the sensors 71 and 72 is structured by a light-transmission type photo interrupter. In the origin sensor 71, an outer circumferential portion of the origin detection plate 62 is sandwiched between a light emitting device and a light receiving device, and in the rotation sensor 72, an outer circumferential portion of the rotation detection plate 63 is sandwiched between a light emitting device and a light receiving device. Accordingly, by the intermediation of each of the detection plates 62 and 63 between the light emitting device and the light receiving device of each of the sensors 71 and 72, based on whether or not the notch (i.e., the detection target region 69 or each of the detection target portions 70) exists at a position corresponding to each of the sensors 71 and 72 (i.e., a position corresponding to an optical path between the light emitting device and the light receiving device), the light receiving device receives/does not receive light from the light emitting device. Accordingly, the origin sensor 71 can detect the detection target region 69 and the rotation sensor 72 can detect the detection target portions 70.

The above-mentioned structure included in combination in the upper portion of the valve casing 4 is covered by a case 73. The case 73 of this embodiment has a hollow box shape having an opening at the bottom. Similarly to the flange 18 of the valve casing 4, the case 73 having a square cross sectional shape is provided so that four corners thereof face front, rear, left, and right directions. A lower end portion of the case 73 is held by an outer circumferential portion of the flange 18 and mounted to an upper portion of the valve casing 4. Installation screws 74 are screwed into the step portions 19 of the valve casing 4 from above the case 73.

A substantially rectangular shaped hole 75 which is vertically long-slender is formed in a rear corner portion of the case 73. Accordingly, a tip end portion of the indication piece 48 can be viewed with the eyes from the outside of the case 73. The indication piece 48 vertically moves along the substantially rectangular shaped hole 75 in accordance with the vertical movement of the needle 6. Accordingly, the opening degree of the needle valve can be visually confirmed based on a vertical position of the indication piece 48. A sticker 76 for indicating the opening degree of the needle valve may be provided on an outer surface of the case 73 at a position along the substantially rectangular shaped hole 75.

The motor 7, the upper limit sensor 60, the lower limit sensor 61, the origin sensor 71, and the rotation sensor 72 are connected to the controller 8. In this embodiment, the sensors 60, 61, 71, and 72 are electrically connected to the connector board 57 via the sensor board 58. Further, the motor 7 is also electrically connected to the connector board 57. Further, the connector board 57 is electrically connected to the controller 8 via a cable 77 extended from a front lower portion of the valve casing 4. As described above, in this embodiment, the motor 7, the upper limit sensor 60, the lower limit sensor 61, the origin sensor 71, and the rotation sensor 72 are connected to the controller 8 via the connector board 57.

In the controller 8, the upper limit sensor 60 and the lower limit sensor 61 detect the detection target piece 49, to detect the upper limit position and the lower limit position of the needle 6. Further in the controller 8, the origin sensor 71 detects the detection target region 69 of the origin detection plate 62 at a certain position, and the rotation sensor 72 detects each of the detection target portions 70 of the rotation detection plate 63. In addition, the controller 8 includes a circuit for generating a control signal including a drive pulse with respect to the motor 7, and the generated control signal can be output to the motor 7. Accordingly, a rotation in a normal direction or a reverse direction and a rotation angle of the motor 7 is arbitrarily controlled. Further, by changing an interval of the drive pulse, an rotation speed is controlled.

In the following description, in terms of a rotation direction of the motor 7, the term "normal direction" indicates a direction in which the rotor 44 rotates to move the needle 6 downward (i.e., the direction indicated by the arrow of each of FIGS. 3 and 4), and the term "reverse direction" indicates a direction in which the rotor 44 rotates to move the needle 6 upward.

Assuming that the detection target piece 49 is located between the upper limit sensor 60 and the lower limit sensor 61, the controller 8 obtains an origin of the needle 6 as follows. That is, the controller 8 first causes the motor 7 to rotate in the normal direction, and causes the needle 6 to move downward to the lower limit position where the lower limit sensor 61 detects the detection target piece 49. As a result, first, according to the movement of the detection target piece 49 in the vertical direction, the origin is roughly obtained. Next, the controller 8 controls the motor 7 while monitoring the origin detection plate 62 by using the origin sensor 71 to cause the origin detection plate 62 and thereafter the rotor 44 to stop at predetermined rotation stop positions, respectively. Accordingly, the vertical position of the needle 6 is finely adjusted, and finally the origin is obtained with high accuracy.

To be more specific, as shown in FIG. 3, in the state where the lower limit sensor 61 detects the detection target piece 49, the detection target region 69 of the origin detection plate 62 is located at a position where the detection target region 69 does not corresponds to the origin detection plate 62. In this state, the rotor 44 and thereafter the origin detection plate 62 are rotated in the normal direction, the detection target region 69 moves to a position corresponding to the origin sensor 71 after a while, and the origin sensor 71 detects the detection target region 69. This position may be referred to as the origin, but in this embodiment, the rotor 44 is rotated in the normal direction after the detection target region 69 passes the origin sensor 71 by a predetermined amount (e.g., 4 pulses). After that, the controller 8 causes the motor 7 to rotate in the reverse direction, and the origin sensor 71 detects the detection target region 69 of the origin detection plate 62 again. This position is defined as the origin. Accordingly, a backlash caused by the screw portion between the rotor 44 and the needle 6 can be eliminated. Accordingly, in a case of opening the needle valve by causing the rotor 44 to rotate in the reverse direction from the origin position, without an influence of the backlash, it is possible to open the needle valve by an accurate opening degree.

The controller 8 monitors the rotation detection plate 63 by using the rotation sensor 72 while controlling the motor 7 to drive. The rotation sensor 72 regularly detects the detection target portions 70 in accordance with the rotation of the rotor 44 and thereafter the rotation detection plate 63, and the detection pulse is input to the controller 8 as a detection signal. That is, the controller 8 drives the motor 7 so as to vertically move the needle 6, and in accordance therewith, obtains the detection signal of the detection target portions 70 as the pulse from the rotation sensor 72. Accordingly, the controller 8 compares the detection signal from the rotation sensor 72 with the control signal to the motor 7 so as to be capable of monitoring an abnormal rotation of the motor 7. For example, in a case where the drive pulse is sent to the motor 7 but the rotation sensor 72 does not detect the detection pulse, it is detected that the abnormal rotation occurs.

In this embodiment, a stepping motor having a step angle of 7.5 degrees is used as the motor 7. In this case, the rotation of the rotor 44 by 7.5 degrees corresponds to one pulse, and the rotation thereof by 360 degrees corresponds to 48 pulses. Correspondingly, 48 notches being the detection target portions 70 are formed in the rotation detection plate 63 at the identical intervals in the circumferential direction. Accordingly, by causing the motor 7 to rotate by one pulse, the rotation sensor 72 can obtain one pulse. The drive pulse with respect to the motor 7 and the detection pulse obtained by the rotation sensor 72 are compared one by one, whereby the rotation of the motor 7 can be monitored. Then, in a case where those pulses are out of sync by a predetermined amount (e.g., 4 pulses) or more, the controller 8 generates an error signal.

Further, the origin sensor 71 detects the detection target region 69 by one rotation of the rotor 44, so the controller 8 monitors the abnormal rotation of the motor 7. To be specific, in a case where the motor 7 is caused to rotate once but the origin sensor 71 never detects the detection target region 69, the controller 8 generates an error signal. Accordingly, although the mere use of the rotation sensor 72 may lead to malfunction due to vibration, the use of the origin sensor 71 together with the use of the rotation sensor 72 makes it possible to reliably detect the abnormal rotation of the rotor 44. In order to reliably conduct the detection, the detection target region 69 of the origin detection plate 62 may be formed larger than the step angle of the motor 7. In this embodiment, the detection target region 69 is formed to have a dimension three times as large as the step angle.

The controller 8 controls the needle 6 to return the origin not only in a case of starting the control of the needle valve but also in a case of detecting an error by the rotation sensor 72 or the origin sensor 71. Further, also in a case where the upper limit sensor 60 detects the detection target piece 49, the controller 8 controls the needle 6 to return the origin.

According to the needle valve of this embodiment, the needle 6 vertically moves without rotating. Thus, the gap between the needle 6 and the valve casing 4 is reliably and durably sealed. Further, according to the needle valve of this embodiment, in addition to the use of the lower limit sensor 61 for detecting the vertical position, the use of the origin sensor 71 for detecting the position in the circumferential direction enables obtaining the origin with high accuracy.

The needle valve of this embodiment is used in, for example, an oil-combustion type boiler, to adjust a flow rate of oil to be supplied to a burner thereof. According to the structure of this embodiment, in a case where a combustion state of the boiler is shifted between a low combustion state and a high combustion state, the flow rate of oil can be readily adjusted according to a change of inverter frequency of a blower for adjusting an air supply rate with respect to the burner. In this case, a control board (not shown) of the boiler and the controller 8 of the needle valve are electrically connected to be used.

The needle valve of the present invention is not limited to the structure of this embodiment, and can be modified appropriately. In this embodiment, the support columns 56 are inserted into the notches 50 formed in the rotation regulating member 47. However, the structure for preventing the rotation regulating member 47 from rotating can be modified appropriately. For example, the support columns 56 are slidably inserted into holes formed in the rotation regulating member 47.

Further, in this embodiment, the rotation sensor 72 detects each of the detection target portions 70 by the step angle of the motor 7. However, the detection target portions 70 may be formed in the rotation detection plate 63 without corresponding to the step angle of the motor 7.

The invention claimed is:

1. A needle valve, comprising:
a stepping motor including a rotor having a cylinder shape;
a needle screwed into a center hole of the rotor so that the needle is retractable;
a rotation regulating member for allowing the needle to move with respect to the rotor in a longitudinal direction of the needle, and preventing the needle from rotating together with the rotor;
a projection point sensor for detecting a projection of the needle by a set length with respect to the rotor by means of a movement of the needle in the longitudinal direction of the needle;
an origin detection plate that integrally rotates with the rotor;
an origin sensor for monitoring the rotation of the origin detection plate; and
a controller for driving the stepping motor until the projection point sensor detects the projection of the needle by the set length, and monitoring the rotation of the origin detection plate by using the origin sensor to control the stepping motor so that the origin detection plate stops at a predetermined rotation stop position.

2. A needle valve according to claim 1, wherein:
the needle valve is formed with a tapered portion provided in a tip end portion of a rod-shaped screw portion with an intermediation of a circular rod portion;
the rod-shaped screw portion is screwed into the center hole of the rotor so that the rod-shaped screw portion is retractable, the circular rod portion is retractable with respect to a valve casing while a gap between the circular rod portion and the valve casing is sealed, and the tapered portion is inserted into the valve casing;
the rotation regulating member is fixed to a base end portion of the rod-shaped screw portion, and is retractable along a support column whose position is set with respect to the valve casing while being prevented from rotating together with the rod-shaped screw portion; and
the projection point sensor comprises a photosensor for detecting that the rotation regulating member is at a predetermined position.

3. A needle valve according to claim 2, wherein:
the origin detection plate comprises a circular plate having a detection target region having a substantially sector shape formed at a portion in an outer circumferential portion of the circular plate;
the origin sensor comprises a photosensor for detecting the detection target region; and
the controller drives the stepping motor until the projection point sensor detects the projection of the needle by the set length, causes the stepping motor to rotate in one direction until the detection target region passes the origin sensor and proceeds by a predetermined amount, and causes the stepping motor to rotate in a reverse direction until the origin sensor detects the detection target region, to obtain an origin of the needle.

4. A needle valve according to claim 3, further comprising:
a rotation detection plate comprising a circular plate and integrally rotating with the rotor; and
a rotation sensor for monitoring the rotation of the rotation detection plate,
wherein the controller monitors, during driving and controlling the stepping motor, an abnormal rotation of the stepping motor in response to a detection signal from the rotation sensor.

5. A needle valve according to claim 4, wherein the controller monitors, during driving and controlling the stepping motor, the abnormal rotation of the stepping motor based on a detection of the detection target region by the origin sensor by one rotation of the rotor.

6. A needle valve according to claim 5, wherein:
the rotation sensor is capable of detecting the rotation of the rotation detection plate by a step angle of the stepping motor; and
the origin detection plate includes the detection target region having a region corresponding to twice to a plurality of times as large as the step angle of the stepping motor.

7. A needle valve according to any one of claims 2 to 6, wherein;
a tapered portion of the needle is inserted in an orifice included in the valve casing so that the tapered portion is retractable to adjust a flow rate; and
a shape of the tapered portion and a shape of the orifice are formed such that a proportional relationship between an opening degree and the flow rate is established.

8. A needle valve according to any one of claims 1 to 6, further comprising a retreat point sensor for detecting a retraction limit of the needle with respect to the rotor.

9. A needle valve according to claim 7, further comprising a retreat point sensor for detecting a retraction limit of the needle with respect to the rotor.

* * * * *